United States Patent
Ansinn

(10) Patent No.: US 7,464,518 B2
(45) Date of Patent: Dec. 16, 2008

(54) PACKAGE HEAT SEAL QUALITY INDICATOR USING UV VISIBLE THERMOCHROMIC INK

(75) Inventor: Detlev D. Ansinn, Bridgman, MI (US)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 11/624,739

(22) Filed: Jan. 19, 2007

(65) Prior Publication Data

US 2008/0173385 A1 Jul. 24, 2008

(51) Int. Cl.
 *B65B 57/18* (2006.01)
 *B65B 51/26* (2006.01)
 *B65B 51/20* (2006.01)
 *B65B 51/10* (2006.01)
 *B65B 9/20* (2006.01)
 *G01M 3/38* (2006.01)

(52) U.S. Cl. .............. 53/451; 53/479; 53/75; 53/508; 53/551; 53/373.7; 53/373.9; 73/52; 206/459.1

(58) Field of Classification Search ........... 53/450, 53/451, 550, 551, 508, 75; 73/52; *B65B 51/10*, *B65B 51/26*
See application file for complete search history.

(56) References Cited

U.S. PATENT DOCUMENTS

| | | | | |
|---|---|---|---|---|
| 3,533,548 A | * | 10/1970 | Taterka | 206/459.1 |
| 3,616,898 A | * | 11/1971 | Massie | 206/459.1 |
| 3,925,139 A | * | 12/1975 | Simmons | 156/358 |
| 4,228,761 A | * | 10/1980 | Glover et al. | 116/201 |
| 4,331,491 A | * | 5/1982 | Shaw et al. | 156/64 |
| 4,344,909 A | | 8/1982 | De Blauwe | |
| 4,359,897 A | * | 11/1982 | Ugo | 73/146 |
| 4,410,379 A | | 10/1983 | Franckx | |
| 4,480,749 A | * | 11/1984 | Laucis et al. | 206/459.1 |
| 4,490,426 A | | 12/1984 | Franckx | |
| 4,641,402 A | | 2/1987 | Vansant et al. | |
| 4,795,509 A | | 1/1989 | De Bruycker | |
| 5,377,474 A | * | 1/1995 | Kovacs et al. | 53/64 |
| 5,411,777 A | | 5/1995 | Steele et al. | |
| 5,501,945 A | * | 3/1996 | Kanakkanatt | 430/338 |
| 5,505,040 A | * | 4/1996 | Janssen et al. | 53/451 |
| 5,727,684 A | * | 3/1998 | Webb et al. | 206/459.1 |
| 5,755,081 A | * | 5/1998 | Rivett et al. | 53/477 |
| 5,830,547 A | * | 11/1998 | MacKenzie et al. | 428/36.1 |
| 6,055,786 A | * | 5/2000 | Hubbard et al. | 52/409 |
| 6,059,319 A | | 5/2000 | Wyke | |
| 6,316,751 B1 | | 11/2001 | Wyke et al. | |
| 6,471,058 B2 | * | 10/2002 | Kannabiran et al. | 206/459.1 |
| 6,632,403 B1 | * | 10/2003 | Barmore et al. | 422/102 |
| 7,334,702 B2 | * | 2/2008 | Cunningham et al. | 222/1 |
| 2003/0200725 A1 | | 10/2003 | Aloisi et al. | |
| 2004/0020172 A1 | | 2/2004 | Biba et al. | |

(Continued)

FOREIGN PATENT DOCUMENTS

AU 9719980 A * 11/1997

*Primary Examiner*—Stephen F Gerrity
(74) *Attorney, Agent, or Firm*—Michael Best & Friedrich LLP

(57) ABSTRACT

A method of verifying seal quality of a packaging material includes providing packaging material, and applying a thermochromic ink to at least one portion of the packaging material. The method also includes applying heat to the at least one portion of packaging material to form a seal, and inspecting the packaging material to determine the quality of the seal.

28 Claims, 5 Drawing Sheets

U.S. PATENT DOCUMENTS

2004/0031243 A1  2/2004  Aloisi et al.
2005/0100247 A1* 5/2005  Kannankeril et al. ........... 383/5
2005/0179548 A1  8/2005  Kittel et al.

* cited by examiner

PACKAGE HEAT SEAL QUALITY INDICATOR USING UV VISIBLE THERMOCHROMIC INK

BACKGROUND

The present invention relates to methods and apparatus for forming and inspecting package seals. Existing methods used to verify the quality of package seals include: individual manual and visual inspection, destructive testing, and testing in vacuum chambers. Other methods of verification generally include statistical sampling techniques characterized by the frequency with which a product is inspected for desired seal quality.

Some techniques of verification include the utilization of machine vision with the purpose of identifying leaks in the seal areas of packaged products. For example, an infra red thermal sensing camera can be used to detect residual heat on the seal of a package subsequent to a packaging procedure. Such techniques generally require a relatively high level of package consistency and precise timing when moving or manipulating the sealed package from sealing to verification.

Other techniques of verification include electromechanical methods where physical pressure is applied to a packaged product, such as a bag. For example, precision feedback devices can be utilized to test characteristics of the packaged product at more than one stage of the manufacturing process. Testing the product at various stages can indicate whether a differential exists between stages. For example, in the food industry, bags are generally inflated and sealed to help protect brittle products. Feedback devices can be implemented to test the pressure of the sealed bag at different stages of manufacturing to determine the presence of leaks.

Various other techniques are utilized to determine the seal quality of packaged products.

SUMMARY

Current techniques of seal quality verification include destructive tests of the actual product. However, one advantage of the current invention is that seal quality verification is performed with non-contact and non-destructive techniques. For example, the current invention is applicable in the verification of package seal quality where destructive tests (generally performed by electromechanical systems) are not practical, such as in the fresh produce industry.

One objective of the invention is to provide a means to consistently and reliably form heat seals and verify the quality of the package heat seals.

In one embodiment, the invention provides a method of verifying seal quality of a packaging material. The method includes providing packaging material, and applying a thermochromic ink to at least one portion of the packaging material. The method also includes applying heat to the at least one portion of packaging material to form a seal, and inspecting the packaging material to determine the quality of the seal.

In another embodiment, the invention provides an apparatus operable for the verification of seal quality in a packaging material. The apparatus includes a printing stage operable to apply thermochromic ink to packaging material, a sealing stage operable to apply heat to at least a portion of the packaging material to form a seal, and a quality inspection stage operable to determine the quality of the seal.

In another embodiment, the invention provides a method of sealing a package. The method includes providing packaging material including at least one film of heat sensitive material, and applying a first thermochromic ink to at least one portion of packaging material. The method also includes manipulating the packaging material with a form, fill and seal machine to substantially contact the at least one portion of packaging material with a second portion of packaging material, and using the form, fill and seal machine to form a heat seal with the at least one portion of packaging material and the second portion of packaging material, where the heat seal has a coloration. The method also includes determining whether the coloration of the heat seal is indicative of an expected temperature reached by the packaging material during the forming a heat seal process.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
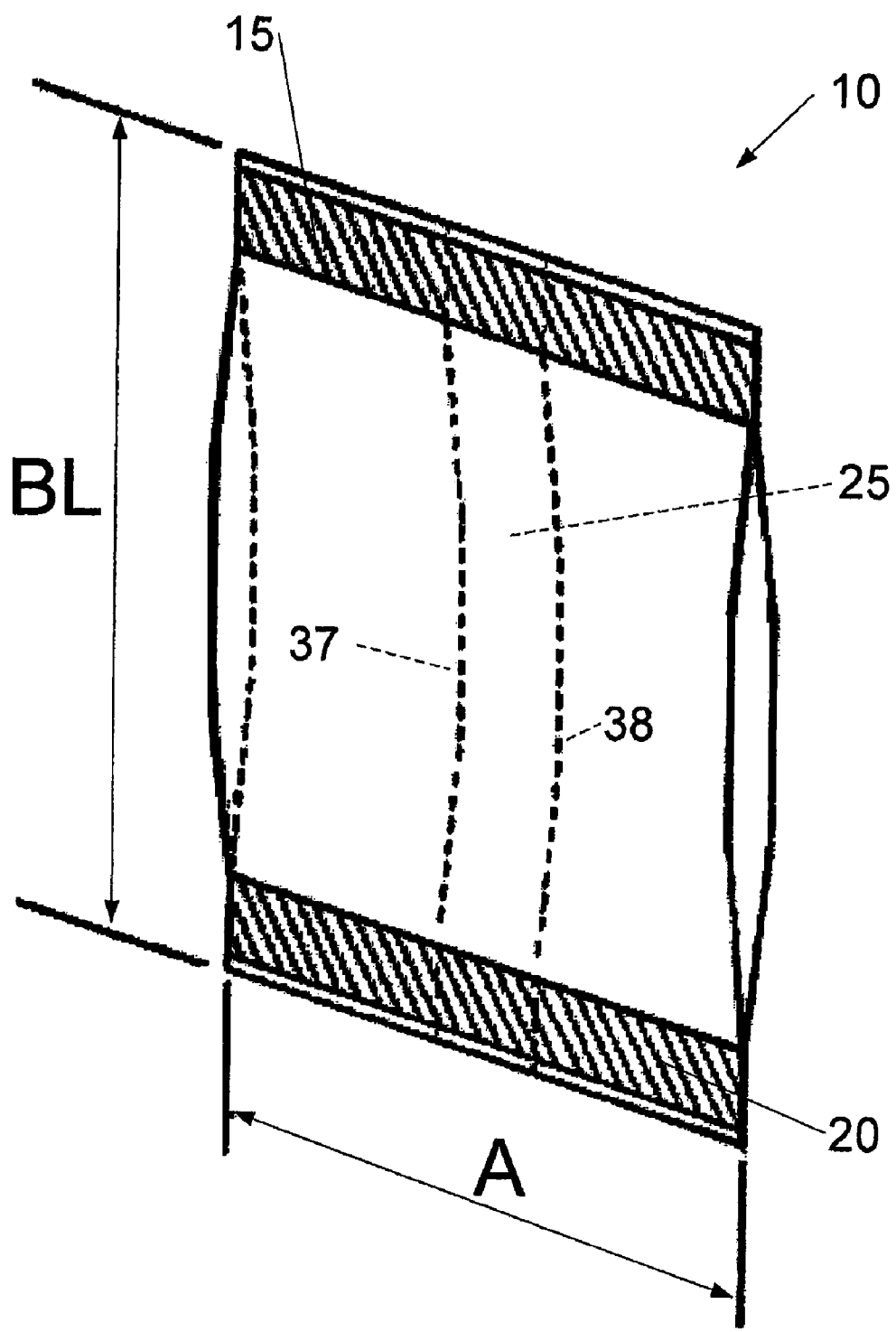
FIG. 1 is a schematic representation of a sealed bag.

FIG. 1 is a schematic representation of a sealed bag 10 that can be at least partially manufactured on a horizontal or vertical Form Fill and Seal (FFS) machine, for example. The sealed bag 10 has a bag length (BL) that is generally vertical in FIG. 1. In this particular example, BL can be parallel to the direction along which the material forming the bag 10 travels during a sealing process. The bag 10 also has a width or horizontal length A (with respect to FIG. 1) defining a distance between two fold lines, as will be described in more detail below. The bag 10 includes an upper cross seal 15, a lower cross seal 20, and a long seal 25 defined substantially between dashed lines 37, 38. The cross seals 15, 20 and the long seal 25 are defined by two or more surface areas of a sheet of material coupled or attached to each other to form a holding space within the sealed bag 10.

Figure 2:
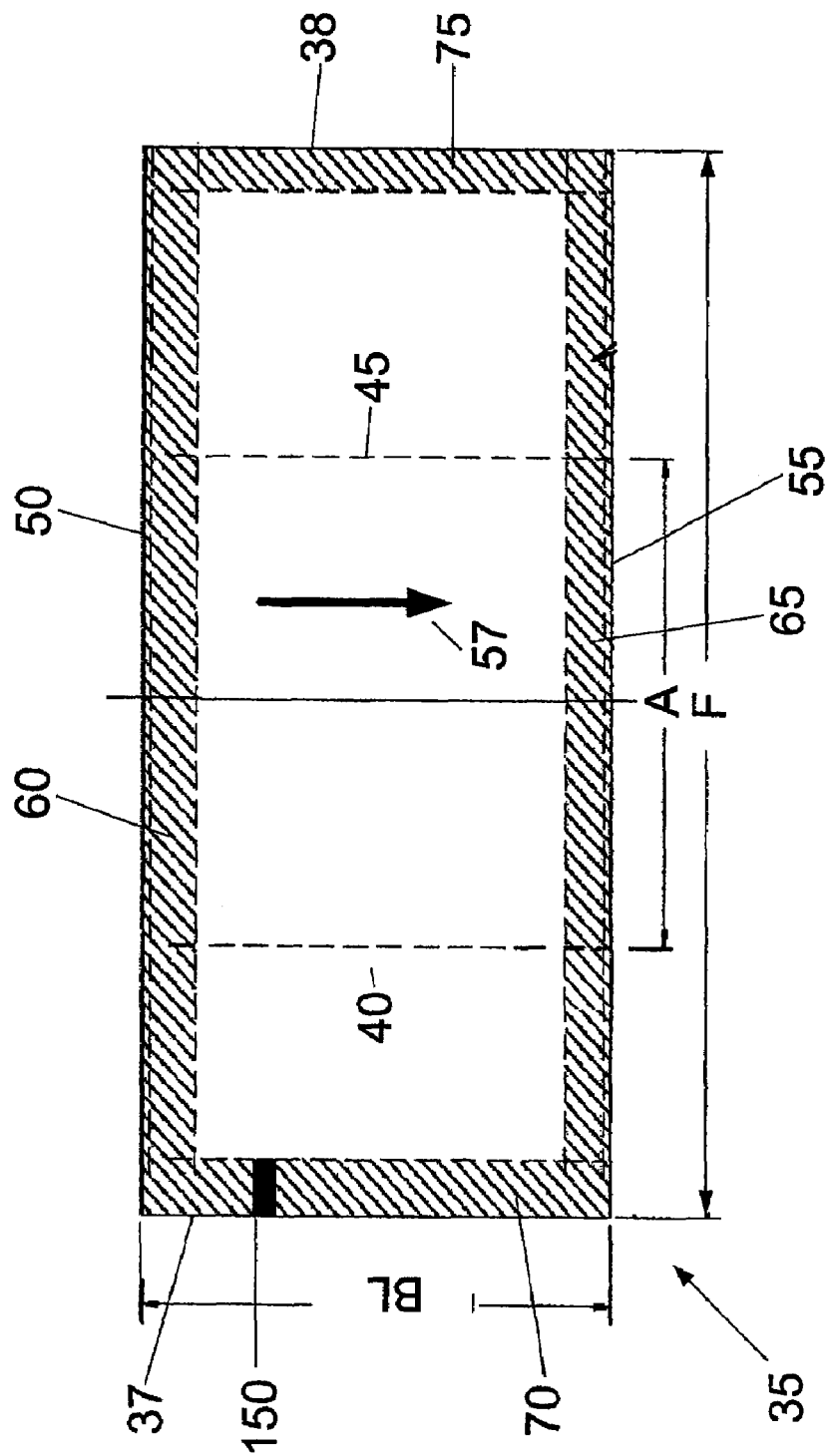
FIG. 2 is a schematic view of a sheet of packaging material for forming the sealed bag in FIG. 1.

FIG. 2 is a schematic representation of a sheet of packaging material 35 that can be utilized to manufacture the bag 10. The sheet 35 can include, but it is not limited to, heat sensitive materials, such as laminated films, polyethylene films, or paper product coated with a heat sealable layer. In reference to FIGS. 1 and 2, the sheet 35 defines a full width F between a left edge 37 and a right edge 38, which can generally define the width of a material source utilized for the manufacturing of the sheet 35. The width F encompasses the length A between a first fold line 40 and a second fold line 45. The sheet 35 also defines the bag length BL between an upper edge 50 and a lower edge 55 of the sheet 35. The length BL is substantially parallel to arrow 57 indicating the direction of travel of sheet 35 for the manufacturing of bag 10.

The sheet 35 of FIG. 2 includes an upper seal area 60 substantially adjacent to the upper edge 50, a lower seal area 65 substantially adjacent to the lower edge 55, a left seal area 70 substantially adjacent to the left edge 37, and a right seal area 75 substantially adjacent to the right edge 38 (with respect to FIG. 2). The seal areas 60, 65, 70, 75 generally define areas of the sheet 35 that overlap or come into contact with each other through the manufacturing process of the bag 10. It is to be understood that the seal areas 60, 65, 70, 75 can include dimensions and shapes other than the ones illustrated. Moreover, the bag 10 and sheet 35 shown in FIGS. 1 and 2 are only exemplary constructions and other dimensions or shapes of the elements described above fall within the scope of the invention.

Figure 3:
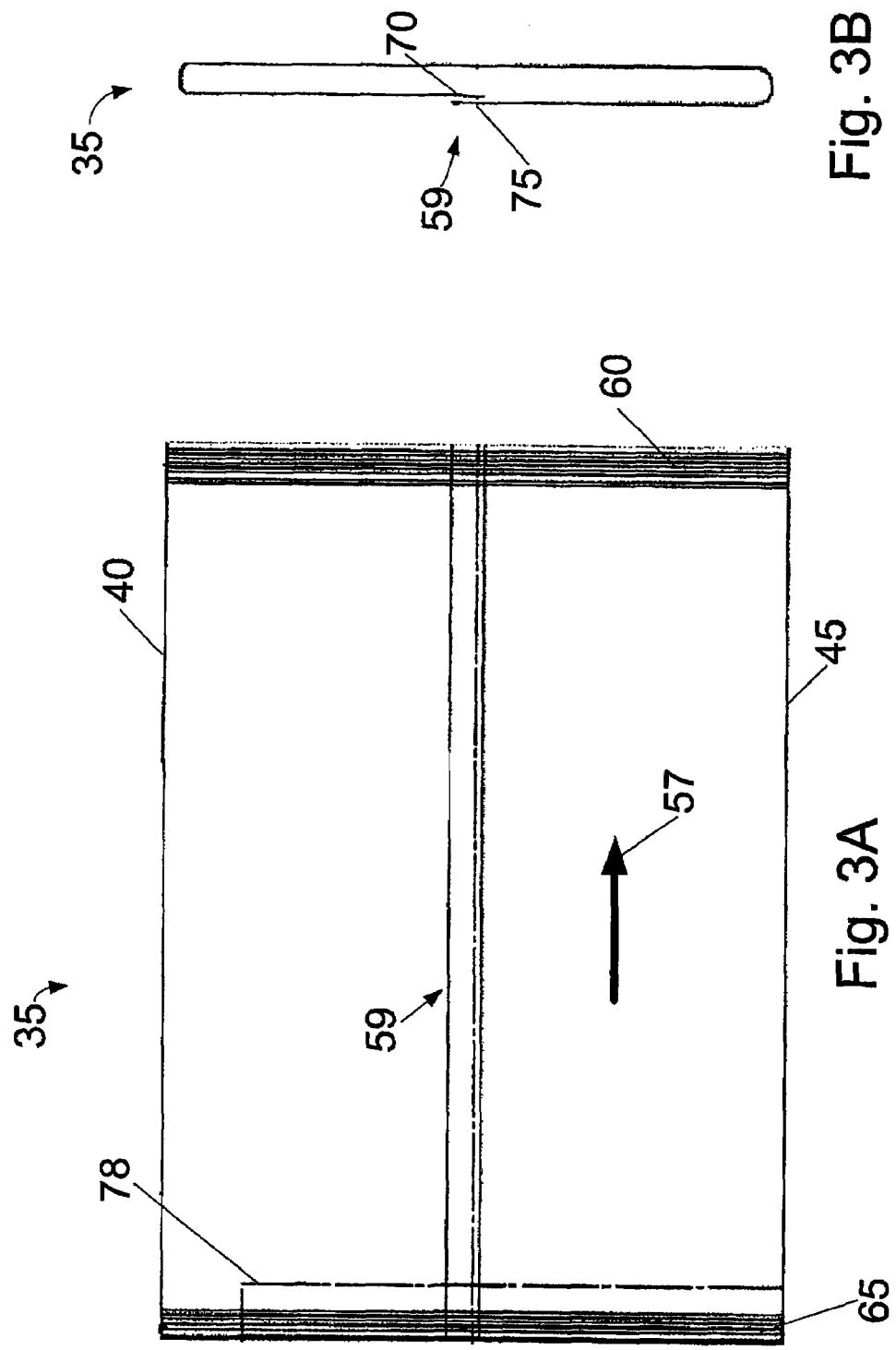
FIG. 3A is a schematic side view of the sheet in FIG. 2 folded.
FIG. 3B is an end view of the sheet in FIG. 3A.

FIGS. 3A and 3B are a side view and an end view of the sheet 35 folded along the first fold line 40 and the second fold line 45, shown in FIG. 2. It is to be understood that "folding" is not limited to forming a sharp crease along fold lines, such as lines 40 and 45. Moreover, "folding" is inclusive of any deformation formed in sheet 35 such as bending the sheet 35 without forming a crease (as shown in FIG. 3B), for example. With reference to FIGS. 3A and 3B, it is possible to observe that folding the sheet 35 along the first fold line 40 and the second fold line 45 generates an overlap 59 of the left seal area 70 and the second seal area 75. It can also be observed from the folded sheet 35 that the outermost portions of the upper seal area 60, defined to the right of the second fold line 45 and to the left of the first fold line 40, overlap with the inner most portions of the upper seal area 60, defined between the first fold line 40 and the second fold line 45. Similarly, it can be observed that the outermost portions of the lower seal area 65, defined to the right of the second fold line 45 and to the left of the first fold line 40, overlap with the inner most portions of the lower seal area 65, defined between the first fold line 40 and the second fold line 45.

As shown in FIG. 3A, the process of folding sheet 35 can include the travel direction defined by arrow 57, also shown in FIG. 2. In some constructions, the manufacturing of the bag 10 from sheet 35 can include forming a set of perforations 78 to provide relatively easier access to the product within the sealed bag 10. In other constructions, the manufacturing of bag 10 can include the process of applying an adhesive material to the sheet 35 prior to folding the sheet 35. More specifically, any suitable adhesive of chemical or mechanical nature can be applied to the seal areas 60, 65, 70, 75 for coupling of the overlapping portions of the seal areas 60, 65, 70, 75 and forming bag 10 as shown in FIG. 1, for example.

In some constructions, the material of sheet 35 can be sensitive to the application of heat, and thus the manufacturing of bag 10 can include applying heat to portions of the sheet 35. More specifically, manufacturing of the bag 10 can include applying heat to the overlap areas defined by the seal areas 60, 65, 70, 75 to form seals 15, 20, 25, shown in FIG. 1.

Applying heat to portions of the sheet 35 can include the processes of heat sealing portions of the sheet 35 or welding portions of the sheet 35.

The manufacturing of bag 10 can include heat sealing portions of the sheet 35 in cases where the sheet 35 includes laminated films, polyethylene films, or paper material coated with a heat sealable material, for example. The process of heat sealing can include the application of heat to sheet 35 with heated jaws that seal through the combination of heat and pressure, heated sealing plates, jaws that contain hot wires, or through impingement of hot air. For example, the heat sealing process can include forming seals defined by the overlap areas of the seal areas 60, 65, 70, 75 by deforming, melting, or transforming the surface or a portion of the material included in the areas defined by the seal areas 60, 65, 70, 75. Furthermore, forming the long seal 25 can include applying heat to the overlap 59 of sheet 35 shown in FIGS. 3A and 3B. In the particular case where the sheet 35 is manufactured of a paper product with a polyethylene film, the sealing process can include applying heat to the left seal area 70 overlapped with the right seal area 75 to melt the polyethylene surface and form the long seal 25.

The manufacturing of bag 10 can also include welding portions of the sheet 35 in cases where the sheet 35 is manufactured of a heat sealable or heat sensitive material, for example. The process of welding can include the application of heat to sheet 35 with heated jaws that seal through the combination of heat and pressure, heated sealing plates, jaws that contain hot wires, or ultrasonic welding. For example, the welding process can include forming seals defined by the overlap areas of the seal areas 60, 65, 70, 75 by deforming, melting, or transforming the material included in the portions of sheet 35 defined by the seal areas 60, 65, 70, 75. For example, forming the long seal 25 can include applying heat to the overlap 59 of sheet 35 as shown in FIGS. 3A and 3B. In the particular case where the sheet 35 is manufactured of a heat sensitive material, the welding process can include applying heat to the left seal area 70 overlapped with the right seal area 75 to melt the heat sensitive material and form the long seal area 25. For ease of description, the term "seal" or "heat sealing" is consider to alternatively encompass sealing and/or welding material through this current application.

Figure 4:
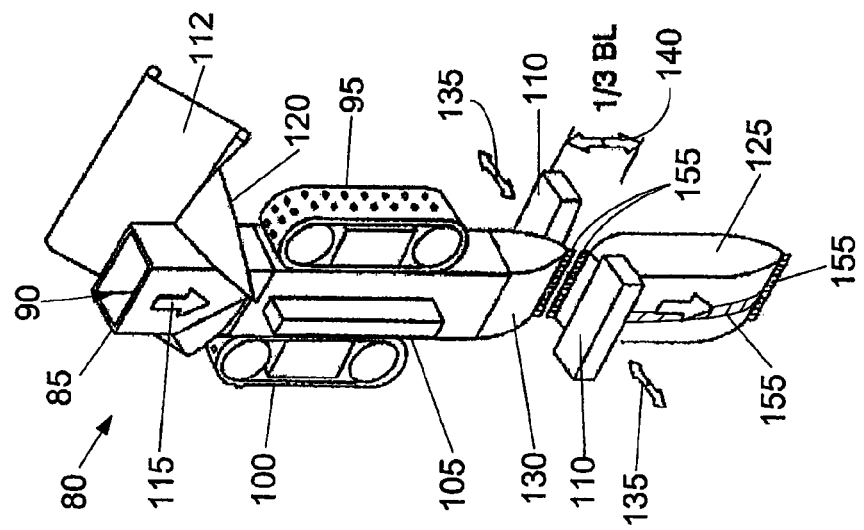
FIG. 4 is a schematic representation of a vertical form fill and seal (VFFS) machine.
Figure 5:
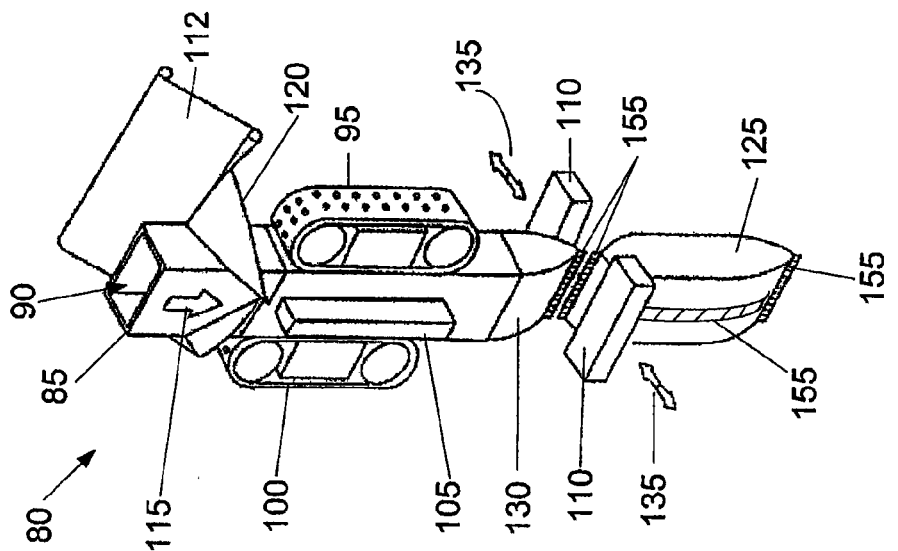
FIG. 5 is a schematic representation of an alternative VFFS machine.

FIGS. 4 and 5 schematically illustrate a vertical form fill and seal (VFFS) machine 80 operable to form, fill, and seal packages or bags 10 by applying heat to heat sensitive material. The VFFS machine 80 generally includes a hollow tube 85 having an opening or aperture 90 extending therethrough, a first belt system 95, a second belt system 100, a long seal bar 105, and a pair of cross seal jaws 10. The first belt system 95 and the second belt system 100 can include pull belts, vacuum belts, friction belts, transport belts, and other types of belts operable to help move sheet material 112 relative to the tube 85 and in the direction indicated by arrow 115. The sheet 35 for forming bag 10 is a portion of the sheet material 112 fed to the VFFS machine 80. It is to be understood that the VFFS machine 80 shown in FIGS. 4 and 5 is only exemplary and not limiting to the scope of the invention. For example, the VFFS machine 80 can operate with only one of the first belt system 95 and the second belt system 100. Moreover, other seal machines fall within the scope of the invention.

In reference to FIG. 4, packaging film or sheet material 112 for forming bags 10, for example, is fed to the VFFS machine 80 from a source of sheet material (not shown) and formed into a hose or tubular cross section around tube 85. As the sheet material 112 is fed to the VFFS machine 80, the sheet material 112 is directed by shoulders (not shown) to wrap material around the tube 85 causing free edges 120 of the sheet material 112 to overlap. The free edges 120 of the sheet material 112 correspond to edges 37 and 38, shown in FIG. 2. Accordingly, the overlap of sheet material 112 corresponds to overlap 59, shown in FIG. 3B, defined by the left seal area 70 and the right seal area 75. Sheet material 112 is wrapped around the tube 85 and moved downward (relative to FIG. 4) by the first belt system 95 and the second belt system 100. The long seal bar 105 seals or welds the overlapping area, thus forming a seal corresponding to the long seal 25 of the bag 10. Whether the long seal bar 105 seals or welds the overlapping area of the sheet material 112 depends on the composition of the sheet material 112. As the long seal bar 105 seals or welds and the belt systems 95, 100 move the sheet material 112, the sheet material 112 changes from a substantially flat film to a tubular cross section similar to the cross section of the hollow tube 85.

The long seal bar 105 can heat seal through direct contact between the heated long seal bar 105 and the sheet material 112. Additionally, the long seal bar 105 can weld the sheet material 112 by direct contact of the long seal bar 105 and the sheet material 112. Alternatively, the overlapping area can be heat sealed or welded by hot air impingement. Generally subsequent to heat sealing sheet material 112 with the long seal bar 105, the pair of cross seal jaws 110 pinch tubular material 112 beneath the lower open end of the tube 85. The cross seal jaws 110 simultaneously seal the top of a finished bag 125 (cross seal 15 of a finished bag 10), the bottom of an unfinished bag 130 (cross seal 20 of a subsequent bag 10), and perform a cut operation to separate bags 125, 130. Arrows 135 illustrate the motion of the pair of cross seal jaws 110 substantially perpendicular to the motion of sheet material 112 and bags 125, 130. Subsequent to sealing bag 130, product (not shown) can be placed into the bag 130 though the aperture 90 extending through the hollow tube 85.

In the construction shown in FIG. 4, the VFFS machine 80 is controlled to move sheet material 112 vertically and to move the pair of cross seal jaws 110 horizontally, as shown by arrows 115 and 135. In reference to FIG. 5, the VFFS machine 80 can also be controlled to move the pair of cross seal jaws 110 with horizontal and vertical motion as indicated by arrows 135, 140, respectively. In particular to the VFFS machine shown in FIG. 5, the pair of cross seal jaws 110 can simultaneously travel vertically ⅓ of the bag's length BL as the pair of cross seal jaws 110 travel with a horizontal motion illustrated by arrows 135. Other constructions of the VFFS machine 80 can include motion of the cross seal jaws 110 at other rates, directions, velocities, and distances.

The manufacturing of sealed bags or packaged materials includes the process of applying an ink, a coating, a substantially liquid film, or a dye to packaging and/or sheet material. For ease of description, the different alternatives of coatings, dyes, or inks will be described as an ink. However, it is to be understood that the word ink is not limited to the alternatives mentioned above or even to an aqueous material or solution. Moreover, the word ink can encompass materials applied in solid, gaseous, or gel form.

For example, the manufacturing process for creating a sealed bag 10 (shown in FIG. 1) from a sheet 35 (shown in FIG. 2) can include applying an ink to portions of the sheet 35 corresponding to the upper seal area 60, the lower seal area 65, the left seal area 70, and the right seal area 75. The ink applied to the sheet 35 can be selectively applied to one or both sides of the sheet 35. In reference to FIGS. 4 and 5, for example, the manufacturing process for creating sealed bags 125, 130 can include selectively applying an ink to a percentage of the front and/or back surfaces of the sheet material 112.

Applying an ink to packaging or seal material can include applying an ink that changes some of its physical characteristics with the application of heat. More specifically, applying an ink to packaging or seal material can include applying a thermochromic ink to the seal material. Thermochromic inks can generally sensitive to the application of heat and change color in accordance with the temperature the ink is subjected to. In the case of a thermochromic ink applied to seal material, the areas of the seal material exposed to an amount of heat can change coloration. The application of thermochromic inks to seal products can include the use or implementation of flexographic (water, solvent base, or UV) gravure, letterpress, xerographic, laser, thermal transfer, dye sublimation, ink jet, sprayed on, roller applied, offset process, and other application processes.

For example, applying heat to overlapping portions of seal material with thermochromic ink can change the coloration of the material defining the heat seal, thus making it possible to evaluate the quality of the seal. A heat seal can be deemed defective in cases when the coloration of the seal material is not of an expected coloration, or when coloration discontinuities exist on the portions of the seal material where heat is applied. The change in coloration of seal material with thermochromic ink due to the application of heat is generally indicative of the maximum temperature reached by the seal material when heat is applied to the seal material.

Thermochromic inks can exist in both reversible and irreversible versions. Reversible thermochromic ink generally returns to its original coloration when the seal material cools down and returns to the temperature prior to a seal operation that includes applying heat to the seal material. Irreversible thermochromic ink retains the coloration change, which is generally an indication of the highest temperature reached by the seal material during the seal operation. Another type of thermochromic ink is a UV thermochromic ink. In this particular case, the quality of the heat seal can be observed with the use of a UV lamp or device subsequent to the heat sealing process.

The type of thermochromic ink applied to a sheet material is based on the process for verification of heat seal quality. For example, applying a reversible thermochromic ink requires verification of the heat seal soon after the seal is formed because the ink returns to its original coloration after a certain amount of time. Accordingly, a relatively higher level of coordination is needed between a FFS machine and a verification apparatus, such as a heat sensor or optical sensor. Applying a UV visible thermochromic ink requires the use of a UV light source for verification of the heat seal. In a preferred manufacturing process, an irreversible thermochromic ink can be applied considering that it can offer a relatively easier verification process of the heat seal, such as using an optical sensor to verify a coloration change.

More than one thermochromic ink can be applied to a seal material. In reference to FIG. 2, for example, one thermochromic ink can be applied to the upper seal area 60, the lower seal area 65, the left seal area 70, and the right seal area 75. A second thermochromic ink can be applied to a portion 150 of the sheet 35 with the purpose of marking the sheet 35 with a registration mark as a result of a sealing operation. Alternatively, the different thermochromic inks can be applied to other areas of the sheet 35 not specified herein. In some cases, a totality of the area defined by the sheet 35 can be applied with a thermochromic ink. Accordingly, the application of thermochromic inks to seal materials can have purposes other than verifying heat seal quality. For example, thermochromic inks can be used for showing labels, trademarks, instructions, and other markings on a heat sealed product or package.

In reference to FIGS. 4 and 5, a thermochromic ink can be applied to the sheet material 112 prior to supplying sheet material 112 to the VFFS machine 80. More specifically, subsequent to the completion of the sealing process performed by the long seal bar 105 and the pair of cross seal jaws 110, the bag 125 can be released to a conveyor (not shown) as seal areas 155 start to cool down. In the cases when the applied thermochromic ink is daylight visible, the heat signature or coloration change on the seal areas 155 is visible under all light conditions. In the case when the applied thermochromic ink is UV visible, a UV light source is necessary to examine the seal quality of the seal areas 155. Interrupted seal areas 155 or an unexpected coloration are indicative of a defective seal process. In some cases, the long seal bar 105 and/or the pair of cross seal jaws 110 may not be properly adjusted to seal the sheet material 112 or may not reach a desired temperature, thus producing defective seal areas 155.

Figure 6:
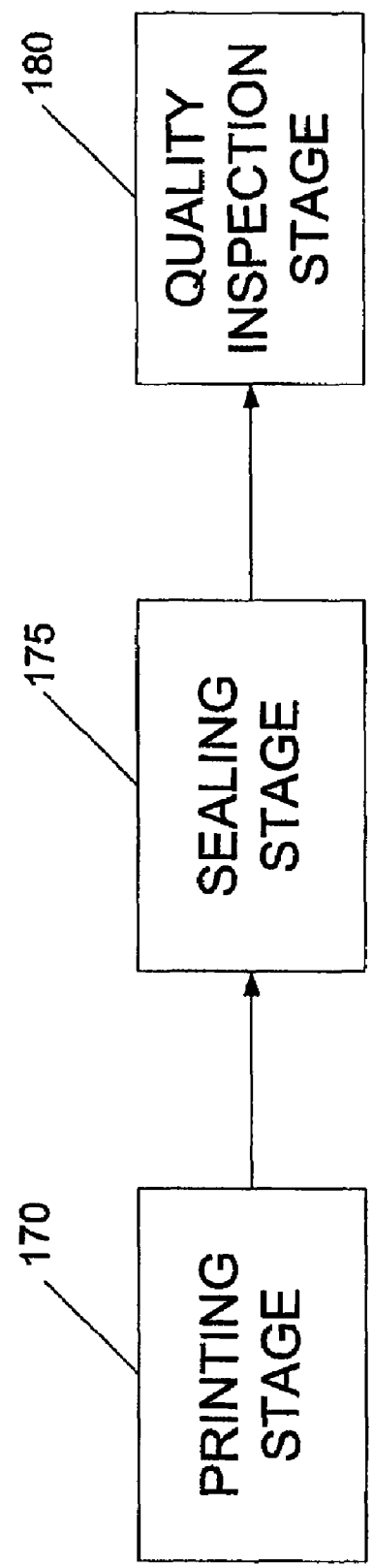
FIG. 6 is a flow diagram of a manufacturing process including package sealing and seal verification.

FIG. 6 is an exemplary flow diagram showing a manufacturing process for creating a heat sealed bag or packaged product. The manufacturing process includes a printing stage 170, a sealing stage 175, and a quality inspection stage 180. The printing stage 170 can include applying a thermochromic ink to seal material by means of an ink jet printer (not shown). The printing stage 170 can also include applying thermochromic ink by methods that do not require printing equipment. Additionally, more than one type of thermochromic ink can be applied at the printing stage 170. In some cases, one thermochromic ink can be applied to portions of the seal material expected to form heat seals during the sealing stage 175 and a second thermochromic ink can be applied to other portions in the form of a logo, trademark, or identification mark, much as the mark 150 shown in FIG. 2 for example.

The sealing stage 175 can include heat sealing or welding the portions of the seal material with the one thermochromic ink by direct contact of heated bars with the seal material. The sealing stage 175 can also include hot air impingement of the portions of seal material where the second thermochromic ink was applied. The quality inspection stage 180 can include a person performing manual inspection, machine vision equipment, UV equipment, or other types of equipment operable for visual inspection of the seals and logo generated by applying heat to the seal material at the sealing stage 175.

It is to be understood the terms such as "upper", "lower", "left", "right", "vertical", or "horizontal" are used relative to the illustrations in this application and in no way limit the invention described herein to a specific orientation. Various features and advantages of the invention are set forth in the following claims.

What is claimed is:

1. A method of verifying seal quality of a packaging material, the method comprising:
    providing packaging material;
    applying a UV visible thermochromic ink to at least one portion of the packaging material;
    thereafter applying heat to the at least one portion of packaging material to form a seal; and
    thereafter inspecting the ink by irradiating a UV light onto the at least one portion of packaging material to determine the quality of the seal.

2. The method of claim 1, wherein providing the packaging material includes providing at least one of a film of heat sensitive material and a paper product with a heat sensitive layer.

3. The method of claim 1, wherein applying the thermochromic ink includes applying an irreversible thermochromic ink.

4. The method of claim 1, wherein applying the thermochromic ink includes applying a reversible thermochromic ink.

5. The method of claim 1, wherein applying the thermochromic ink includes applying a thermochromic ink utilizing a printer.

6. The method of claim 1, wherein applying the thermochromic ink includes applying a thermochromic ink utilizing a spray-on process.

7. The method of claim 1, wherein applying the thermochromic ink includes printing a predetermined pattern onto the packaging material.

8. The method of claim 7, further comprising verifying that the predetermined pattern includes an expected coloration indicative of about the maximum temperature reached by the at least one portion of packaging material during the applying heat process.

9. The method of claim 1, wherein applying heat includes heat sealing the at least one portion of packaging material to form a seal with the packaging material.

10. The method of claim 1, wherein applying heat includes welding the at least one portion of packaging material to form a seal with the packaging material.

11. The method of claim 1, wherein applying heat includes impinging hot air onto the packaging material to form a heat seal with the packaging material.

12. The method of claim 1, wherein inspecting the ink includes determining whether the ink includes an expected coloration.

13. The method of claim 12, further comprising determining an approximation of the maximum temperature reached by the at least one portion of packaging material during the step of applying heat to the at least one portion of packaging material.

14. The method of claim 1, wherein inspecting the ink includes determining whether a discontinuity is formed in the seal.

15. The method of claim 1, further comprising
    providing a form, fill and seal machine; and
    supplying the packaging material to the form, fill and seal machine, wherein applying heat to the at least one portion of the packaging material includes forming the seal to at least partially enclose a product with the packaging material.

16. The method of claim 1, further comprising
    applying a second thermochromic ink to a second portion of the packaging material; and
    applying heat to at least part of the second portion of packaging material.

17. An apparatus operable for the verification of seal quality in a packaging material, the apparatus comprising:
    a printing stage operable to apply a UV visible thermochromic ink to at least one portion of the packaging material;
    a sealing stage operable to apply heat to the at least one portion of the packaging material to form a seal; and
    a quality inspection stage operable to determine the quality of the seal by irradiating a UV light onto the at least one portion of packaging material for inspecting the ink.

18. A method of sealing a package, the method comprising:
    providing packaging material including at least one film of heat sensitive material;
    applying a UV visible thermochromic ink to at least one portion of packaging material;
    manipulating the packaging material with a form, fill and seal machine to substantially contact the at least one portion of packaging material with a second portion of packaging material;

using the form, fill and seal machine to form a heat seal with the at least one portion of packaging material and the second portion of packaging material, the heat seal having a coloration visible under UV light due to the thermochromic ink; and determining whether the coloration of the heat seal is indicative of an expected temperature reached by the packaging material during the forming a heat seal process by irradiating UV light onto the at least one portion of packaging material.

19. The method of claim 18, wherein providing packaging material includes providing a paper product laminated with the one film of heat sensitive material.

20. The method of claim 18, wherein using the form, fill and seal machine includes actuating a pair of cross seal jaws in a first direction and a second direction substantially perpendicular to the first direction.

21. The method of claim 18, wherein applying the thermochromic ink includes applying an irreversible thermochromic ink.

22. The method of claim 18, wherein applying the thermochromic ink includes applying a reversible thermochromic ink.

23. The method of claim 18, wherein applying the thermochromic ink includes applying a thermochromic ink utilizing a printer.

24. The method of claim 18, wherein applying the thermochromic ink includes applying a thermochromic ink utilizing a spray on process.

25. The method of claim 18, wherein applying the thermochromic ink includes forming a predetermined pattern of thermochromic ink onto the packaging material.

26. The method of claim 18, wherein determining the coloration of the heat seal includes verifying that the predetermined pattern includes an expected coloration indicative of the maximum temperature reached by at least one portion of packaging material.

27. The method of claim 18, wherein determining the coloration of the heat seal includes verifying whether a discontinuity exists in the heat seal.

28. The method of claim 18, wherein forming the heat seal includes impinging hot air onto the at least one portion of packaging material and the second portion of packaging material.

* * * * *